H. Woodman.

Machine for Cleaning the Cards of Carding Engines.

No. 514. Reissued Dec. 8, 1857.

N. PETERS, PHOTO-LITHOGRAPHER, WASHINGTON, D. C.

H. Woodman.

Machine for Cleaning the Cards of Carding Engines.

No. 514. Reissued Dec. 8, 1857.

N. PETERS, PHOTO-LITHOGRAPHER, WASHINGTON, D. C.

H. Woodman.

Machine for Cleaning the Cards of Carding Engines

No. 514. Reissued Dec. 8, 1857.

N. PETERS, PHOTO-LITHOGRAPHER, WASHINGTON, D. C.

UNITED STATES PATENT OFFICE.

HORACE WOODMAN, OF BIDDEFORD, MAINE.

IMPROVEMENT IN CLEANING TOP CARDS OF CARDING-MACHINES.

Specification forming part of Letters Patent No. 11,448, dated August 1, 1854; Reissue No. 514, dated December 8, 1857.

*To all whom it may concern:*

Be it known that I, HORACE WOODMAN, of Biddeford, in the county of York and State of Maine, have invented Improved Machinery to be Applied to a Carding-Engine for the Purpose of Cleansing its Top Cards; and I do hereby declare that the same is fully described and represented in the following specification and the accompanying drawings, letters, figures, and references thereof.

Figure 1:
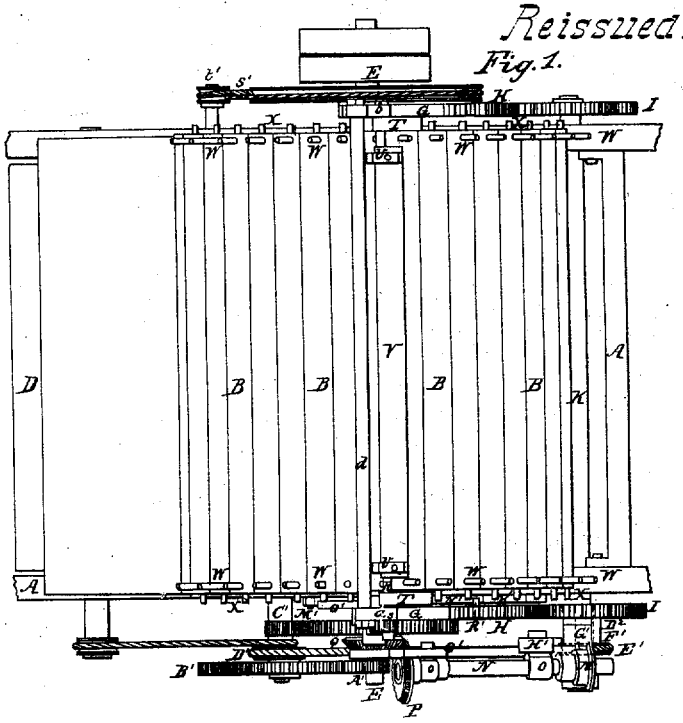
Figure 3:
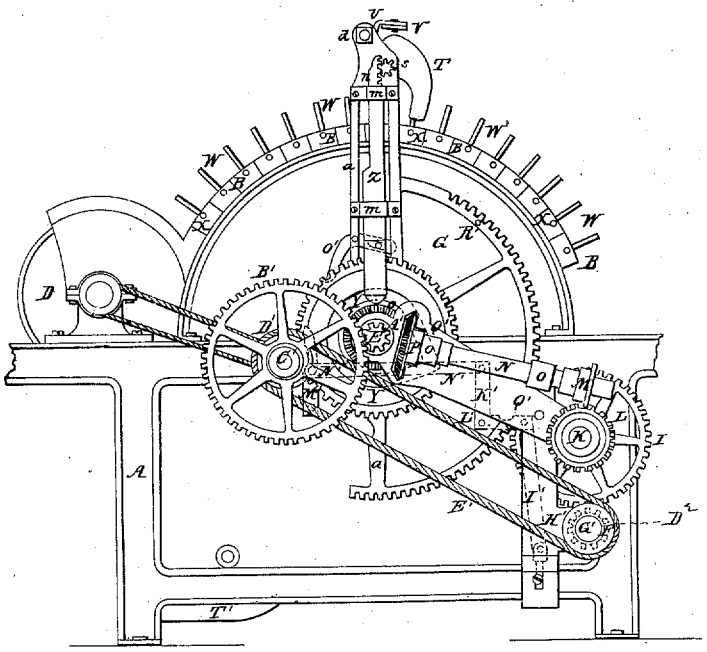
Figure 4:
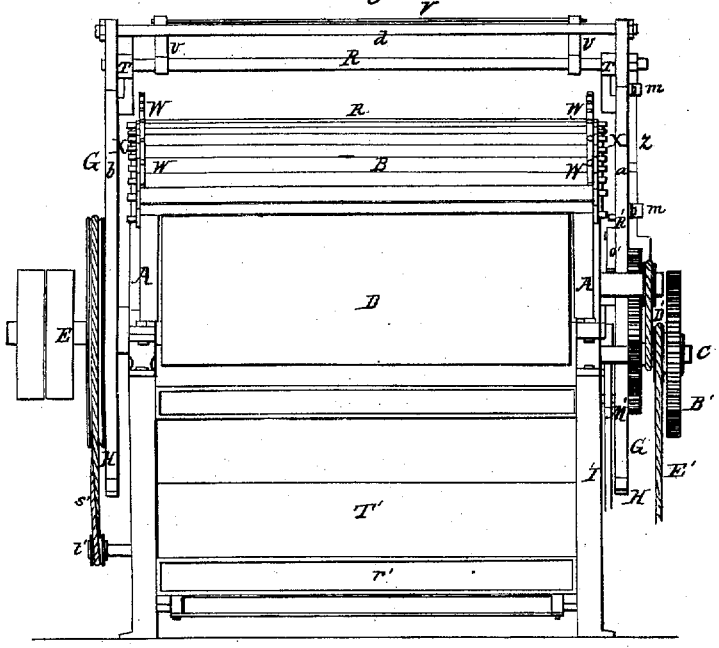
Figure 12:
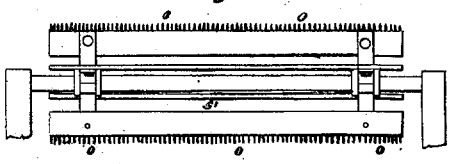
Figure 2:
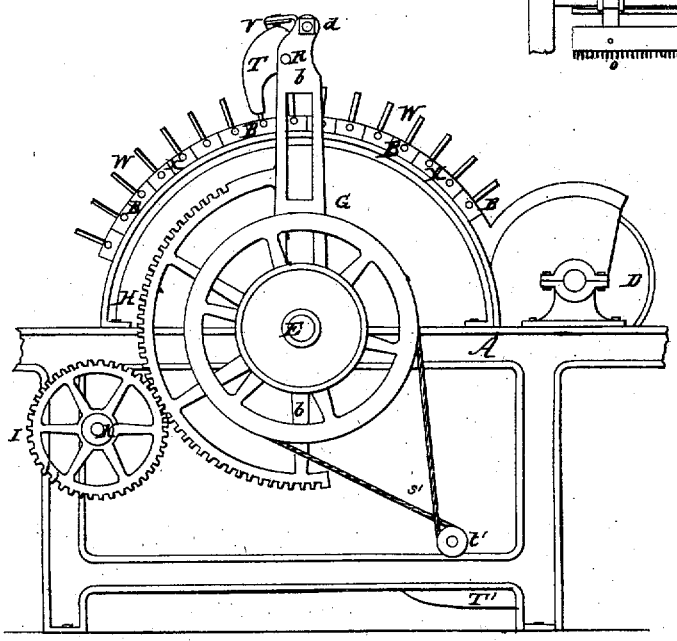
Figure 6:
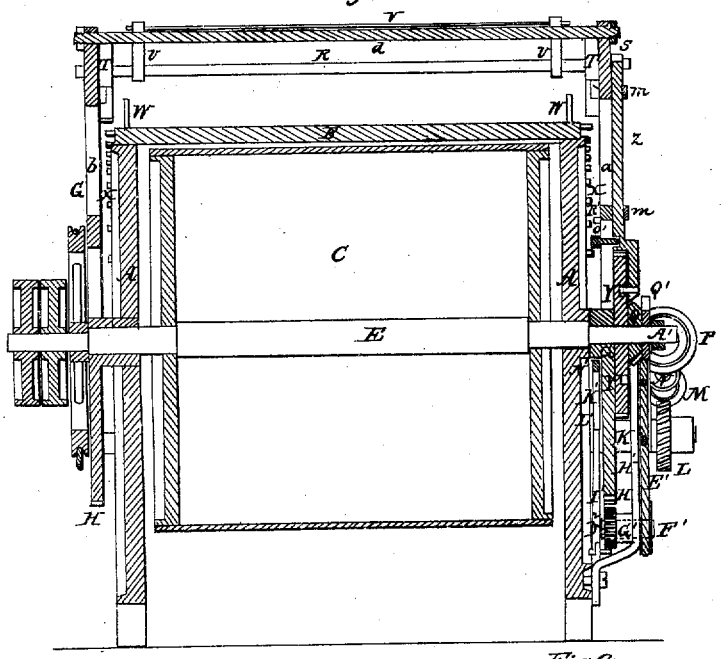
Figure 5:
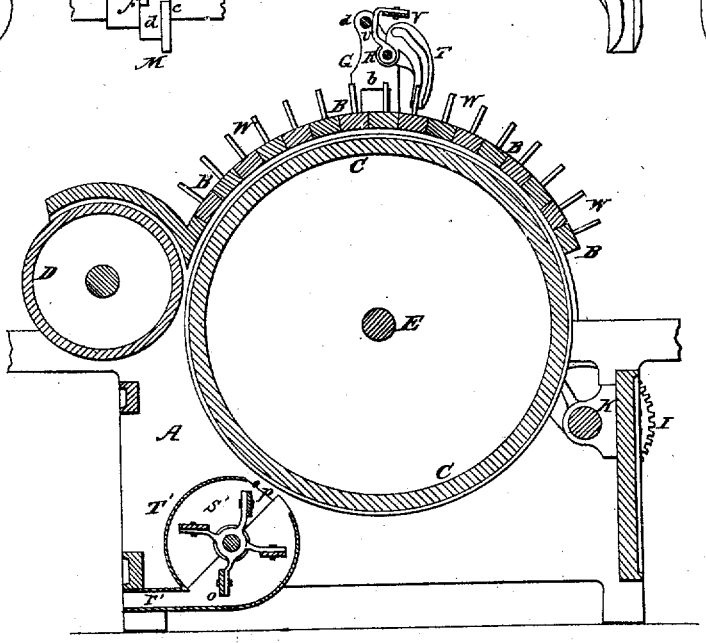

Of the said drawings, Figure 1 denotes a top view of a carding-machine provided with my invention. Fig. 2 is an elevation of that end of it termed the "driving end," or that end to which the driving-power is applied. Fig. 3 is an elevation of the opposite end of it. Fig. 4 is a rear elevation of it. Fig. 5 is a vertical central and transverse section of it. Fig. 6 is a vertical central and longitudinal section of it.

Such other figures as may be necessary to a full description and delineation of my invention will be hereinafter particularly referred to and described.

In the first place, A represents the main frame of a carding-engine, while B B B denote a series of top cards thereof, each of which cards is composed of a bar or lug, B, having a strip of card filleting fixed on its under surface in the usual manner. The main card-cylinder is shown at C, and the doffing-cylinder at D, many of the remaining well-known working parts of the carding-machine not being represented in the drawings, they having no special reference to my invention, being such as are in general use.

Until within a very short period it has been customary to cleanse the top cards of a carding-engine by manual labor, each at a proper time being removed from its seat and cleansed by a card or instrument held in the hand and operated by a workman or attendant.

Recently a mechanism or invention for automatically cleansing the top cards has been applied to a carding-machine, its purpose being to effect the elevation of each of the top cards in succession from the bed or frame on which such cards are supported, the cleansing of such top cards, and their subsequent return to the bed.

The nature of my invention consists in an improved and greatly simplified mechanism for producing such results, and I will here allude to several particulars thereof, which I deem prominent, viz:

First. The arrangement of the base or heavy operating parts of my machine below the top cards and near the axis of the cylinder, thereby giving strength and compactness to the machinery and firmness to its action, while it relieves the upper or outer extremities of cumbrous weight. It will be understood that this remark applies to that part designed to do the lifting and stripping.

Second. The adaptation and application of the grooved cam, arranged below the top cards, and operating as hereinafter specified, for the purpose of effecting the reciprocating motions essential to the functions of lifting and depressing a top card, as well as to moving the cleansing-bar under the card and back.

Third. The applying this reciprocating motion so obtained to one rotary shaft, upon which is combined both lifters and stripper, thus in a manner reducing the functions of lifting and stripping to a unit.

A rocker-frame, G, composed of two frames, *a b*, and a cross connection-bar, *d*, is made to extend upward from and turn loosely on the shaft E of the main card-cylinder C, the two bars *a* and *b* being placed outside of the framework, as seen in the drawings. A semicircular arc or sector of teeth, H, is affixed to each bar *a* and *b* and made to engage with a spur-gear, I, fixed on a shaft, K, there being two such gears, I I, arranged as seen in the drawings. There is also fixed on said shaft K a worm-gear, L, which is made to engage with a worm or helix thread, M, carried by an inclined shaft, N, that is suitably sustained in bearings *o o*.

Figure 8:
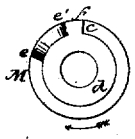
Figure 7:
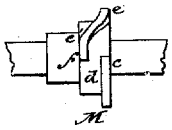

The thread of the worm M is formed more particularly as seen in side view in Fig. 7 and in end view in Fig. 8. From one termination, C, of it, such thread extends around the cylinder *d* (from which it projects) to a point, *e*, and in a plane perpendicular to the axis of the cylinder. From the said point *e* it branches off in a helix to a point, *e'*, from whence to its termination *f* it is parallel to its first part. The first and third parts of the thread of the worm, while revolving in the worm-gear, produce no motion of said gear, and hold it firmly in a state of rest; but while

BEST AVAILABLE COPY the second or helix part of the thread of the worm is working in the gear it turns said gear, and thereby produces rotary motion of the shaft K, and sufficient to move the frame G the distance necessary to enable the lifting machinery of the top cards to operate upon the top card succeeding, and any one just previously cleansed.

Rotary motion of the shaft N is produced by two beveled gears, P Q, one of which is placed on the inner end of the shaft N, while the inner or latter is fixed on the shaft E.

Figure 9:
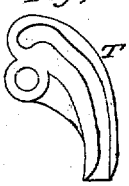
Figure 10:
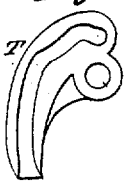

From the above it will be seen that during each revolution of the shaft N the frame G will be moved a certain distance on the main shaft E. The said frame G carries a shaft, R, which turns freely in the two bars *a b*, and has a pinion-gear, *s*, fixed upon one end of it and outside of the bar *a*. The said shaft R carries two grooved lifter-cams, T T, which are formed as seen in Figs. 9 and 10, which exhibit inner side views of said cams. Besides these cams, the shaft R supports, by means of two bent arms, U U, a bar, V, arranged as seen in the drawings, the said bar, when in use, having a strip of card filleting affixed along its inner surface, and it may be termed the "cleansing" or "brush" bar. Each top card, B B, is supported, in the usual way, on two pins, W W, extended from the frame-work, and through the top card near its end, and there is projecting from each end of the said top card a small stud, *x*. When the shaft R is turned in one direction, so as to carry the lifter-cams T T toward any two studs of the top card, and for the purpose of cleansing said top card, the said studs will be received into the grooves of the cams, and, owing to the eccentricity of these grooves and their peculiar action on the studs, the top card will be raised upward from off its seat, and the brush or card bar V will be carried underneath and in contact with the filleting of the said top card and made to cleanse it, it being understood that the grooves of the lifter-cams T T are so formed as to cause the entire under surface of the card filleting to be thoroughly brought into contact with and cleansed by the cleansing-bar V. As soon as this has been accomplished the shaft R is rotated in the opposite direction, so as not only to move the cleansing-bar V from underneath the top card, but to depress said top card down upon its seat.

Figure 11:
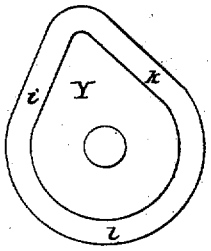

In order to effect the reciprocating rotary motions of the shaft R, I employ a grooved cam, Y, and a sliding rack-bar, Z, the said grooved cam being formed as seen in side view in Fig. 11, and fixed on the main shaft E. Into the groove of this cam a round pin projecting from one end of the sliding rack-bar Z is made to extend, and so that during the rotary motion of the cam a suitable reciprocating rectilinear motion of the sliding bar Z may be produced, such being effected during the time that the pin is traveling in the straight parts *i k* of the groove of the cam, and which straight parts are arranged at an acute angle with respect to one another, and are connected by a semicircular portion, *l*, of a groove, such latter portion of the groove producing no movement of the rack-bar while the pin of said rack-bar is traveling in it. This sliding rack-bar Z slides freely in boxes or bearings *m m*, (attached to the bar *a*,) and has a rack of teeth, *n*, which is made to engage with the pinion or gear S of the shaft R, and so as to produce a rotary motion of the said sha whenever the slide-bar Z is moved longitu nally.

From the above it will be seen that any card is raised and depressed by a positiv motion, it not being elevated by mechanism, and afterward suffered to drop down into its place by the action of gravity, nor is it lowered into its place, but is forced downward by the peculiar action of the upper sides of the grooves of the lifter-cam.

By the above-described machinery the frame G will be successively moved from one lug or top card to another throughout the series, and, having performed its office on all of them, or lifted and cleansed each one in succession, the frame G will be moved backward into a position ready to act again on the first top card, which mechanism I shall shortly proceed to describe.

Although I have calculated my mechanism for operating upon each top card successively, I contemplate constructing it so as to remove or lift up every other one instead of every one in succession during the next time the frame G is moved forward over them. There is a pinion, A′, fixed upon the end of the shaft E. This pinion plays into a gear, B′, fixed upon a stationary axle, C′, and carrying a grooved pulley, D′, the whole being arranged as seen in the drawings. Around the said grooved pulley D′ and another pulley, F′, an endless band, E′, extends. The said pulley F′ is fixed to a shaft, G′, (shown in the drawings by dotted lines,) which is sustained in a frame, H′, which is made capable of sliding a short distance either upward or downward, and is suspended by means of a link or connecting rod, I′, to one arm of a bent lever, K′, the same being represented in Fig. 3 by dotted lines.

The said bent lever turns on a fulcrum, L′, and is connected with a vertical lever, M′, by means of a connecting-rod, N′. As soon as the last top card of the series has been depressed upon its seat a projection, O′, from the frame G while said frame is in motion is carried into contact with the upper part of the lever M′ and creates a motion of such lever such as will move the lever K′, so as to cause it to lift upward the sliding frame H′ and carry into gear with the spur I a pinion, $D^2$, that is fixed upon the shaft G′, such gear being kept in rotation by the action of the endless belt E′ at the same time the worm M is lifted out of its worm-gear, and this because one of the bearings O that supports the shaft N is attached to the movable frame H′, the other bearing, O, or that next to the bevel-gear P of the shaft N, being so applied to its sustaining frame or plate Q′ as to allow such movements of the shaft N as will enable the slide H to lift up the shaft sufficiently to throw the worm M out of engagement with the worm-gear L. As soon as the worm is thrown out of engagement, the pinion-gear $D^2$ enters into gear with the wheel and puts it in rotation, so as to create a ·kward movement of frame G. Just pre- to such frame reaching the extent of its ·ward motion, a stud, R′, extending from ·er side of the toothed arc H, is carried ·tact with the horizontal arm of the ·ever K′ and depresses said arm so as to move the slide H′ sufficiently not only to throw the pinion $D^2$ out of engagement with the wheel I, but at the same time move the worm M into engagement with the worm-gear L, such worm and worm-gear while in operation together serving to produce the forward motion of the frame G in the manner hereinbefore specified.

I am aware that various devices of mechanism have been constructed for cleansing the top-flat cards of carding-engines. I do not, therefore, claim to be the first to apply machinery for that purpose; but

I claim as the distinguishing features of my machine, and as my invention, for which I ask Letters Patent, as follows, viz:

1. The application and adaptation of the grooved cam arranged with a sliding bar substantially as specified, or the equivalent therefor, as a means of producing the reciprocating motions by which the raising and depressing of a top card or the reciprocating movements of the brush-bar in cleansing a top card may be effected.

2. The combining of lifter-cams T T and a brush-bar, V, with one rotary shaft R, so that by the movements of such shaft in the manner specified the operations of raising and depressing a top card and cleansing it may be effected in the manner set forth.

HORACE WOODMAN.

Witnesses:

E. STILES,

S. V. LORING.